US011584515B2

(12) United States Patent
Martin

(10) Patent No.: US 11,584,515 B2
(45) Date of Patent: Feb. 21, 2023

(54) TRIPOD LANDING GEAR ASSEMBLY

(71) Applicant: Goodrich Corporation, Charlotte, NC (US)

(72) Inventor: Dennis W Martin, Woodinville, WA (US)

(73) Assignee: Goodrich Corporation, Charlotte, NC (US)

( * ) Notice: Subject to any disclaimer, the term of this patent is extended or adjusted under 35 U.S.C. 154(b) by 81 days.

(21) Appl. No.: 17/183,082

(22) Filed: Feb. 23, 2021

(65) Prior Publication Data

US 2021/0323657 A1    Oct. 21, 2021

Related U.S. Application Data

(60) Provisional application No. 63/011,914, filed on Apr. 17, 2020.

(51) Int. Cl.
*B64C 25/12* (2006.01)
*B64C 25/26* (2006.01)
*B64C 25/34* (2006.01)

(52) U.S. Cl.
CPC .............. *B64C 25/12* (2013.01); *B64C 25/26* (2013.01); *B64C 25/34* (2013.01); *B64C 2025/125* (2013.01)

(58) Field of Classification Search
CPC ......... B64C 25/12; B64C 25/26; B64C 25/34; B64C 2025/125
See application file for complete search history.

(56) References Cited

U.S. PATENT DOCUMENTS

| 1,934,992 | A |   | 11/1933 | Midboe |            |
|-----------|---|---|---------|--------|------------|
| 4,147,316 | A | * | 4/1979  | Kendall | B64C 25/10 |
|           |   |   |         |        | 244/102 R  |
| 4,155,522 | A | * | 5/1979  | Sealey  | B64C 25/10 |
|           |   |   |         |        | 244/102 R  |
| 4,189,117 | A |   | 2/1980  | Masclet et al. |     |
| 4,328,939 | A | * | 5/1982  | Davies  | B64C 25/12 |
|           |   |   |         |        | 244/102 R  |
| 4,345,727 | A | * | 8/1982  | Brown   | B64C 25/12 |
|           |   |   |         |        | 244/102 R  |

(Continued)

FOREIGN PATENT DOCUMENTS

| EP | 3486166 | 5/2019 |
| EP | 3628592 | 4/2020 |

(Continued)

OTHER PUBLICATIONS

European Patent Office, European Search Report dated Sep. 10, 2021 in Application No. 21168166.3.

*Primary Examiner* — Tye William Abell
(74) *Attorney, Agent, or Firm* — Snell & Wilmer L.L.P.

(57) ABSTRACT

A system for use with a tripod landing gear assembly of an aircraft may comprise: a tension strut assembly having a tension strut extending from an upper end to a lower end; a drag brace assembly having an upper brace and a lower brace, the upper brace pivotably coupled to the lower brace at a center point, the lower brace rotatably coupled to the lower end of the tension strut; and a jury linkage pivotally coupled to the drag brace assembly at the center point rotatably coupled to a middle portion of the tension strut, the middle portion between the upper end and the lower end.

20 Claims, 4 Drawing Sheets

(56) References Cited

U.S. PATENT DOCUMENTS

| | | | | |
|---|---|---|---|---|
| 4,422,602 A | * | 12/1983 | Turiot | B64C 25/14 244/102 R |
| 5,022,609 A | * | 6/1991 | Cranston | B64C 25/12 244/102 R |
| 9,205,917 B2 | | 12/2015 | Acks et al. | |
| 2015/0314860 A1 | * | 11/2015 | Henrion | B64C 25/22 244/102 A |
| 2019/0144104 A1 | * | 5/2019 | Fortier | B64C 25/20 244/102 R |
| 2020/0094950 A1 | * | 3/2020 | Bennett | B64C 25/20 |

FOREIGN PATENT DOCUMENTS

| | | |
|---|---|---|
| EP | 319210 | 5/2021 |
| FR | 2139182 | 1/1973 |
| WO | 2014083170 | 6/2014 |

\* cited by examiner

TRIPOD LANDING GEAR ASSEMBLY

CROSS-REFERENCE TO RELATED APPLICATIONS

This application is a non-provisional of, and claims priority to, and the benefit of U.S. Provisional Application No. 63/011,914, entitled "TRIPOD LANDING GEAR ASSEMBLY," filed on Apr. 17, 2020, which is hereby incorporated by reference in its entirety.

FIELD

The present disclosure relates to landing gear of aircraft and, more particularly, to a tripod landing gear assembly.

BACKGROUND

Many aircraft include landing gear having wheel assemblies to allow the aircraft to travel along the ground during taxi, takeoff, and landing. A tripod main landing gear assembly may be beneficial structurally due to unidirectional loading in each one of the primary members of the landing gear. Typical tripod landing gear assemblies utilizes a toggle lock arrangement between braces that fold up and allow stowage in a bay of an aircraft. A toggle lock may be less stable than desired for a tripod landing gear assembly. A toggle lock may experience undesirable dynamics during operation of a typical tripod landing gear assembly.

SUMMARY

A system for use with a tripod landing gear assembly of an aircraft is disclosed herein. The system may comprise: a tension strut assembly having a tension strut extending from an upper end to a lower end; a drag brace assembly having an upper brace and a lower brace, the upper brace pivotably coupled to the lower brace at a center point, the lower brace rotatably coupled to the lower end of the tension strut; and a jury linkage pivotally coupled to the drag brace assembly at the center point rotatably coupled to a middle portion of the tension strut, the middle portion between the upper end and the lower end.

In various embodiments, the system may further comprise: an upper drag spindle joint configured to rotatably couple a drag brace upper end of the drag brace assembly to the aircraft; an upper tension strut spindle joint configured to rotatably couple the jury linkage to the middle portion of the tension strut; and a lower tension strut spindle joint configured to rotatably couple a drag brace lower end of the drag brace assembly to a lower portion of the tension strut, the lower portion between the lower end and the middle portion proximate the lower end. The system may further comprise a shock strut assembly having an outer cylinder configured to be coupled to the aircraft, and an inner cylinder configured to be coupled to the tension strut between the upper tension strut spindle joint and the lower tension strut spindle joint. The tension strut may define a tension strut centerline, wherein the lower brace defines a lower brace centerline, wherein the tension strut centerline and the lower brace centerline define a rotation plane, wherein the tripod landing gear assembly is configured to rotate in the rotation plane. The upper brace of the drag brace assembly, the lower brace of the drag brace assembly, and the jury linkage may be pivotally coupled together at a single location. The upper brace of the drag brace assembly, the lower brace of the drag brace assembly, and the jury linkage may be pivotally coupled together at the single location along a pivot axis. The system may further comprise a wheel assembly coupled to the lower end of the tension strut. The jury linkage may be configured to be in an extended position in which a length of the jury linkage extends in a straight line in response to the tripod landing gear assembly being in a down and locked position and in response to the tripod landing gear assembly being in a stowed position. The system may be configured to facilitate locking of the tripod landing gear assembly in a down and locked position and in a stowed position.

A system for use with landing gear of an aircraft is disclosed herein. The system may comprise: a drag brace assembly having an upper brace and a lower brace; a tension strut having an upper end and a lower end, the lower brace rotatably coupled to the tension strut proximate the lower end of the tension strut; a jury linkage pivotably coupled to the upper brace and the lower brace and rotatably coupled to the tension strut.

In various embodiments, the system may further comprise: an upper drag spindle joint configured to rotatably couple a drag brace upper end of the drag brace assembly to the aircraft; an upper tension strut spindle joint configured to rotatably couple the jury linkage to a middle portion of the tension strut; and a lower tension strut spindle joint configured to rotatably couple the lower brace of the drag brace assembly to a lower portion of the tension strut, the lower portion between the lower end and the middle portion proximate the lower end. The system may further comprise a shock strut assembly having an outer cylinder configured to be coupled to the aircraft, and an inner cylinder configured to be coupled to the tension strut between the upper tension strut spindle joint and the lower tension strut spindle joint. The tension strut may define a tension strut centerline, wherein the lower brace defines a lower brace centerline, wherein the tension strut centerline and the lower brace centerline define a rotation plane, wherein the system is configured to rotate in the rotation plane. The upper brace of the drag brace assembly, the lower brace of the drag brace assembly, and the jury linkage may be pivotally coupled together at a single location. The upper brace of the drag brace assembly, the lower brace of the drag brace assembly, and the jury linkage may be pivotally coupled together at the single location along a pivot axis. The jury linkage may be configured to be in an extended position in which a length of the jury linkage extends in a straight line in response to the tripod landing gear assembly being in a down and locked position and in response to the tripod landing gear assembly being in a stowed position. The system may further comprise a wheel assembly coupled to the lower end of the tension strut.

A tripod landing gear assembly for use with an aircraft is disclosed herein. The tripod landing gear assembly may comprise: a shock strut having an outer cylinder configured to be coupled to the aircraft, and an inner cylinder; a drag brace assembly having an upper brace configured to be rotatably coupled to the aircraft and a lower brace pivotably coupled to the lower brace; a tension strut extending from an upper end to a lower end, the lower brace rotatably coupled to the tension strut proximate the lower end of the tension strut; and a jury linkage pivotally coupled to the drag brace assembly and rotatably coupled to the tension strut.

In various embodiments, the tripod landing gear assembly may further comprise: an upper drag spindle joint configured to rotatably couple a drag brace upper end of the drag brace assembly to the aircraft; an upper tension strut spindle joint configured to rotatably couple the jury linkage to a middle portion of the tension strut; and a lower tension strut spindle joint configured to rotatably couple the lower brace of the drag brace assembly to a lower portion of the tension strut, the lower portion between the lower end and the middle portion proximate the lower end. The tripod landing gear assembly may further comprise a wheel assembly coupled to the lower end of the tension strut.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
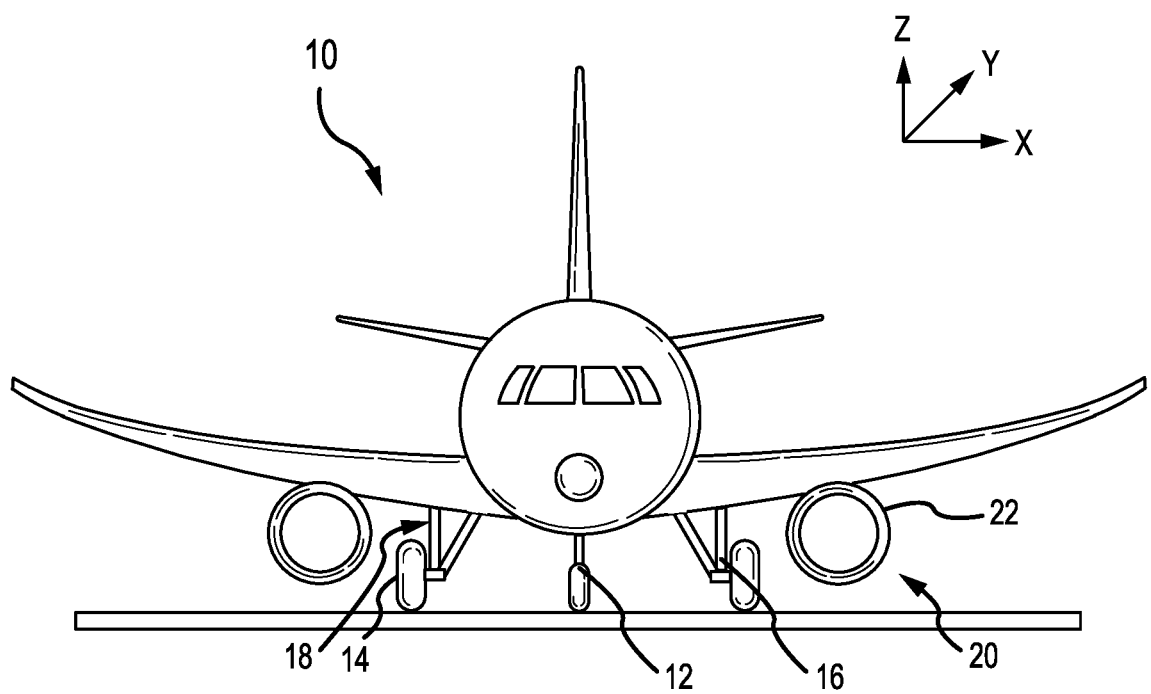
FIG. 1 illustrates an aircraft having multiple landing gear, in accordance with various embodiments.

Referring now to FIG. 1, an aircraft 10 in accordance with various embodiments may include multiple landing gear including a first landing gear 12, a second landing gear 14, and a third landing gear 16. In various embodiments, the second landing gear 14 and the third landing gear 16 may be main landing gear and the first landing gear 12 may be a nose landing gear. Each landing gear may include one or more wheel assemblies. For example, the first landing gear 12 includes one wheel assemblies 18. The landing gear 12, 14, 16 and the wheel assemblies 18 support the aircraft 10 in response to the aircraft 10 being parked and during taxi, takeoff, and landing of the aircraft 10.

The aircraft 10 may further include one or more gas turbine engine 20. The gas turbine engine 20 may be controlled by a pilot (such as by controlling a throttle in a cockpit) to generate thrust to accelerate the aircraft 10. The gas turbine engine 20 may include a nacelle 22.

An X-Y-Z axis is shown throughout the drawings to illustrate the relative orientation of various components.

Figure 2:
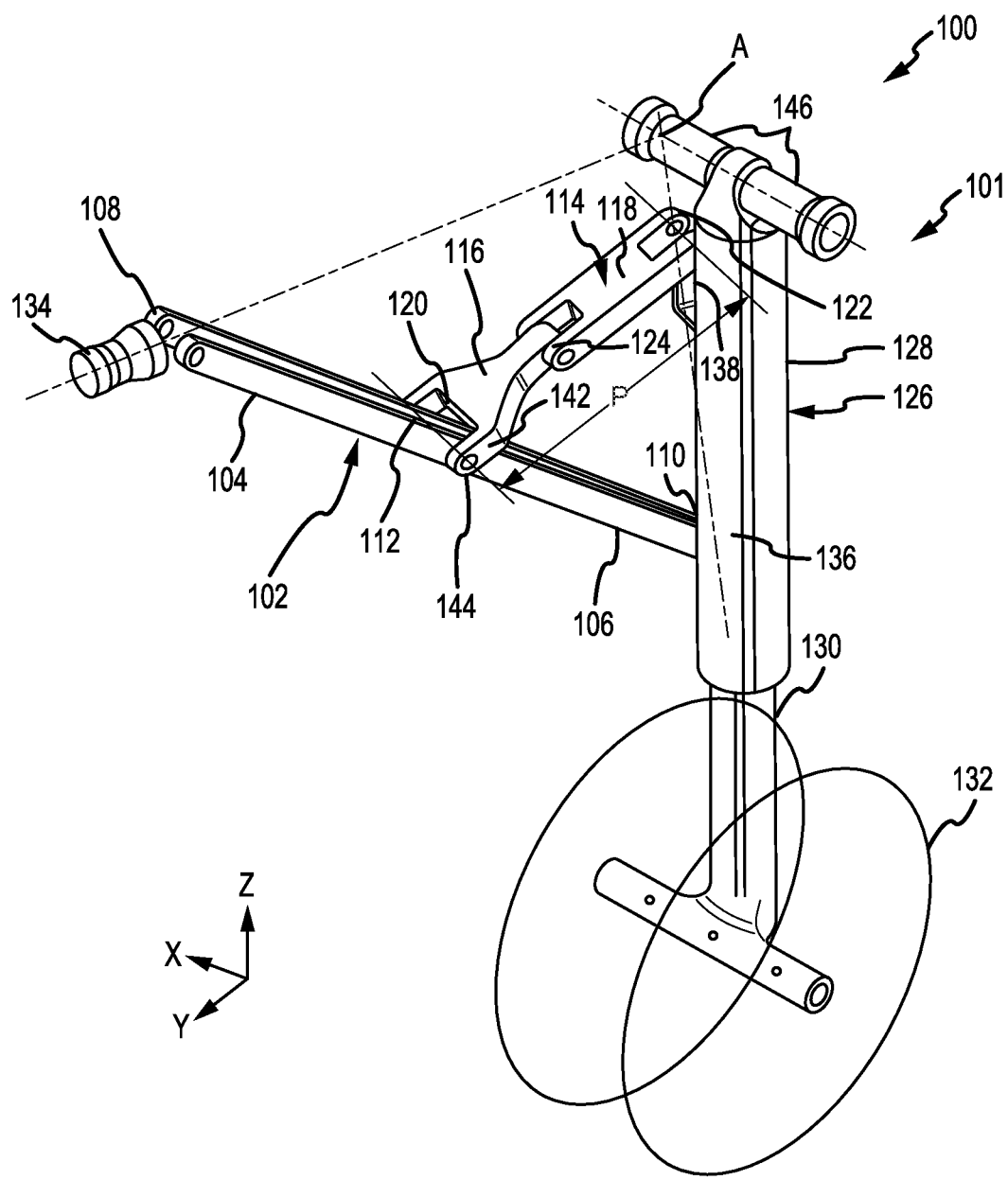
FIG. 2 illustrates a landing gear in a down and locked position, in accordance with various embodiments.
Figure 3:
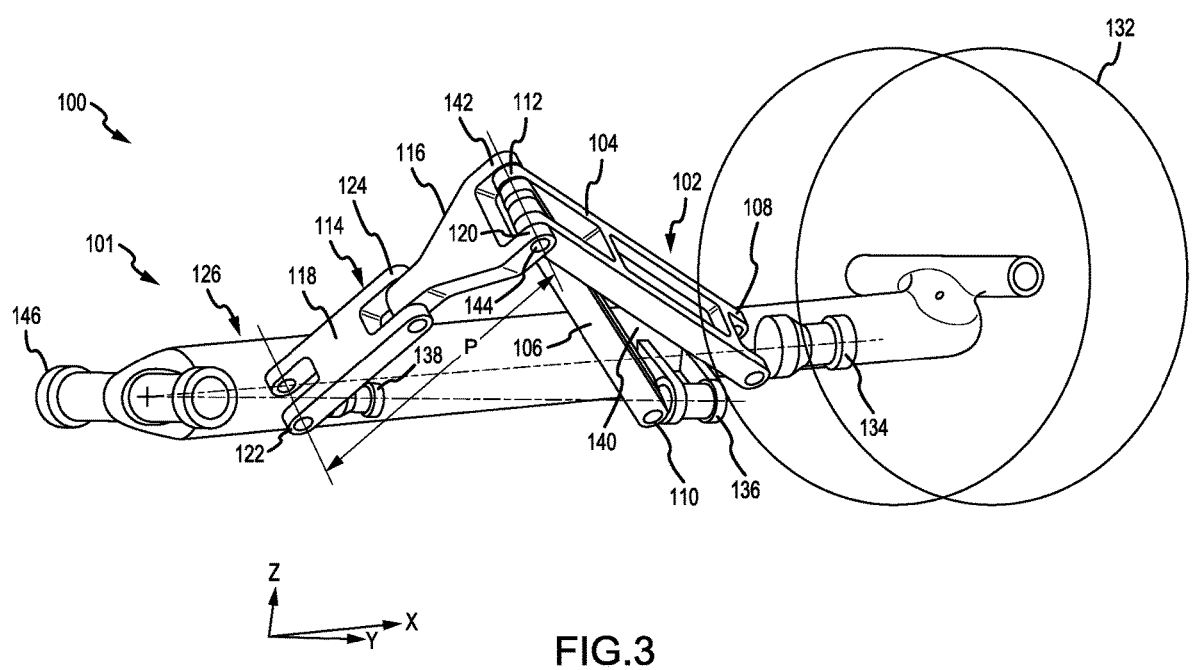
FIG. 3 illustrates a landing gear in a stowed position, in accordance with various embodiments.

Referring now to FIGS. 2 and 3, the landing gear 100 may include a system 101 for supporting the landing gear 100. The landing gear 100 may be used as any landing gear such as the landing gear 12, 14, or 16 of FIG. 1, a nose landing gear, a main landing gear, an auxiliary landing gear, or the like. The system 101 may notably facilitate locking of the landing gear 100 in a down and locked position (as shown in FIG. 2) and in a stowed position (as shown in FIG. 3) without use of an up-lock, and with only the drag brace assembly 102 and the jury linkage 114. This desirably reduces complexity and part count of the landing gear 100, also reducing a total weight of the landing gear 100. The system 101 further facilitates storage of the landing gear 100 in a relatively small compartment.

The system 101 may include a drag brace assembly 102 having an upper brace 104 and a lower brace 106. The system 101 may further include a jury linkage 114 having a brace portion 116 and a strut portion 118. The system 101 may also include a shock strut 126 having an outer cylinder 128 and an inner cylinder 130.

The upper brace 104 of the drag brace assembly 102 may have an upper end 108 that is designed to be rotatably connected to an aircraft structure. The lower brace 106 of the drag brace assembly 102 may have a lower end 110 designed to be rotatably coupled to the shock strut 126. For example, the lower end 110 may be rotatably coupled to the outer cylinder 128 of the shock strut 126. The upper brace 104 of the drag brace assembly 102 may be pivotally coupled to the lower brace 106 at a center point 112.

The brace portion 116 of the jury linkage 114 may have a brace end 120 that is pivotally coupled to the drag brace assembly 102. In various embodiments, the brace end 120 may be pivotally coupled to the center point 112 of the drag brace assembly 102. In that regard, the brace end 120, the upper brace 104, and the lower brace 106 may each be pivotally coupled together at a single location 142. In various embodiments, the brace end 120, the upper brace 104, and the lower brace 106 may each be pivotally coupled together at the center point 112 using a single pin 144 at the single location 142. The single location 142 may be located along a pivot axis A-A'. The pivot axis A-A' may be an axis about which the elements may pivot and may be defined as a single pin 144 axis.

The strut portion 118 of the jury linkage 114 may have a strut end 122 that is rotatably coupled to the shock strut 126. In various embodiments, the strut end 122 may be rotatably coupled to the outer cylinder 128 of the shock strut 126.

The brace portion 116 of the jury linkage 114 and the strut portion 118 of the jury linkage 114 may be pivotally coupled together at a jury center point 124. In that regard, the jury linkage 114 may be referred to as a reshaping jury linkage 114 as it may reform, restructure, or reshape as the landing gear 100 changes states between the down and locked position and the stowed position. A length P of the jury linkage 114 may be extended in a straight line in response to the landing gear being in the stowed position, thus locking the landing gear 100 in the stowed position. Likewise, the length P of the jury linkage 114 may be extended in a straight line in response to the landing gear being in the down and locked position, again locking the landing gear 100 in the down and locked position.

The inner cylinder 130 of the shock strut 126 may be at least partially located within the outer cylinder 128 of the shock strut 126. One or more wheel assembly 132 may be coupled to the inner cylinder 130 of the shock strut 126. In response to the wheel assembly 132 contacting a ground surface, the inner cylinder 130 may be further received by the outer cylinder 128 and displacing a fluid, thus providing shock absorption for the landing gear 100.

The outer cylinder 128 of the shock strut 126 may have a strut attachment 146. The strut attachment 146 may be designed to be coupled to a portion of a corresponding aircraft. In various embodiments, the strut attachment 146 may be pivotally coupled to the aircraft.

The rotatable connections or couplings between components may be facilitated using spindle joints. In particular, an upper drag spindle joint 134 may be located on, or coupled to, the upper end 108 of the drag brace assembly 102. The upper drag spindle joint 134 may likewise be coupled to a portion of the aircraft. In that regard, the drag brace assembly 102 may rotate freely relative to the portion of the aircraft to which the upper drag spindle joint 134 is attached.

A lower drag spindle joint 136 may be located on, or coupled to, the lower end 110 of the drag brace assembly 102. The lower drag spindle joint 136 may likewise be coupled to the outer cylinder 128 of the shock strut 126. In that regard, the drag brace assembly 102 may rotate freely relative to the portion of the outer cylinder 128 to which the lower drag spindle joint 136 is attached.

A jury spindle joint 138 may be located on, or coupled to, the strut end 122 of the jury linkage 114. The jury spindle joint 138 may likewise be coupled to the outer cylinder 128 of the shock strut 126. In that regard, the jury linkage 114 may rotate freely relative to the portion of the outer cylinder 128 to which the jury spindle joint 138 is attached.

As referenced above, FIG. 2 illustrates the landing gear 100 in a down and locked position, and FIG. 3 illustrates the landing gear 100 in a stowed position. The jury linkage 114 may be positioned in a line (i.e., the brace portion 116 and the strut portion 118 may be aligned along a same axis) in response to the landing gear 100 being in the stowed position and in the down and locked position. The jury linkage 114 may be folded (i.e., may form two lines at an angle) during the transition from the stowed position to the down and locked position.

The drag brace assembly 102 may be positioned in a straight line (i.e., the upper brace 104 and the lower brace 106 may be aligned along a same plane, as defined by the three rotation axes defined by the spindle joints 134, 136, 138) in response to the landing gear 100 being in the down and locked position. The drag brace assembly 102 may be angled in response to the landing gear 100 being in the stowed position. In that regard and in response to the drag brace assembly 102 being angled, an angle 140 may exist between the upper brace 104 and the lower brace 106. In various embodiments, the angle 140 may be less than 180 degrees (i.e., between 0 degrees and 180 degrees), less than 90 degrees (i.e., between 0 and 90 degrees), less than 45 degrees (i.e., between 0 and 45 degrees), or the like.

As illustrated in the drawings, the plane of the landing gear 100 shifts as the landing gear 100 is changed between the down and locked position and the stowed position. In particular, the components of the landing gear 100 are aligned in the Y-Z plane in response to the landing gear being in the down and locked position. The plane of the components changes somewhat out of the Y-Z plane such that the components are aligned at least partially in the X-Y plane in response to the landing gear being in the stowed position. Such repositioning of the plane is facilitated by the reforming jury linkage 114 along with the rotatable couplings of the various components.

Figure 4:
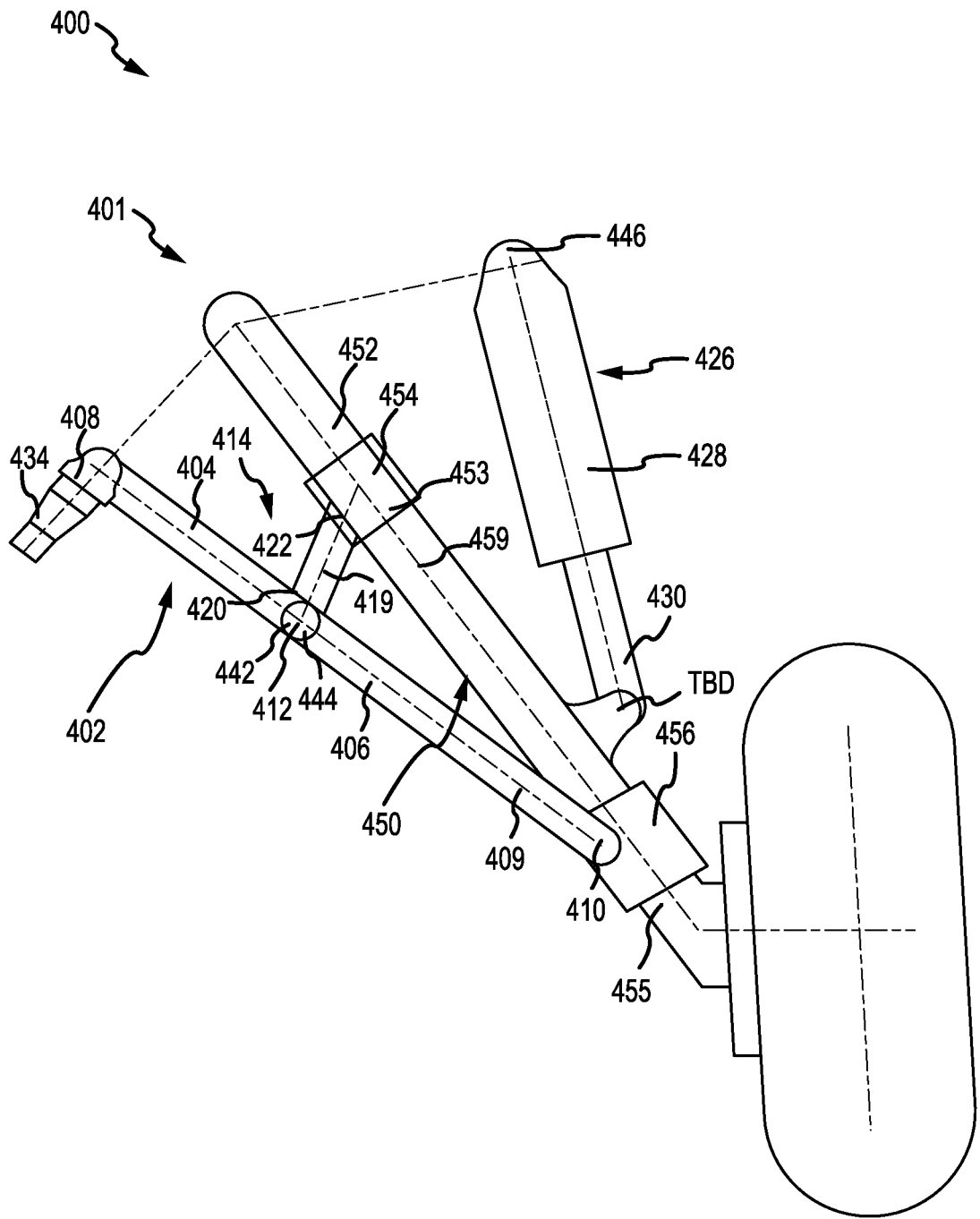
FIG. 4 illustrates a tripod landing gear assembly in a down and locked position, in accordance with various embodiments.

Referring now to FIG. 4, the tripod landing gear assembly 400 may include a system 401 for supporting the landing gear 400. The tripod landing gear assembly 400 may be used as any main landing gear, such as the landing gear 14 or 16 of FIG. 1. The system 101 may notably facilitate locking of the tripod landing gear assembly 400 in a down and locked position (as shown in FIG. 4) and in a stowed position without use of a toggle lock. This desirably reduces complexity and part count of the tripod landing gear assembly 400, also reducing a total weight of the tripod landing gear assembly 400. The system 401 further facilitates storage of the tripod landing gear assembly 400 in a relatively small compartment.

The system 401 may include a drag brace assembly 402 having an upper brace 404 and a lower brace 406. The lower brace 406 may comprise a brace, a strut, or the like. The system may further include a tension strut assembly 450. The system 401 may further include a jury linkage 414. In various embodiments, the jury linkage 414 may be rotatably coupled to the drag brace assembly 402 at an intersection of the upper brace 404 and the lower brace 406. In various embodiments, the jury linkage 414 may include a brace portion and a strut portion in accordance with jury linkage 114. In various embodiments, jury linkage 414 may only include a brace, such as brace portion 116 from jury linkage 114. In various embodiments, in embodiments where jury linkage 414 comprises a reforming jury linkage (e.g., jury linkage 114), the system allows for elimination of an up lock actuator and a down lock actuator. In various embodiments, in embodiments where jury linkage 414 comprises a brace only, the system 401 may still benefit by providing a more stable lock for the tripod landing gear assembly 400 relative to typical tripod landing gear assemblies with toggle locks. The system 401 may further include a shock strut 426 having an outer cylinder 428 and an inner cylinder 430.

The upper brace 404 of the drag brace assembly 402 may have an upper end 408 that is designed to be rotatably connected to an aircraft structure. The lower brace 406 of the drag brace assembly 402 may have a lower end 410 designed to be fixedly coupled to the tension strut assembly 450. The upper brace 404 of the drag brace assembly 402 may be pivotally coupled to the lower brace 406 at a center point 412.

A brace end 420 of the jury linkage 414 may be pivotally coupled to the drag brace assembly 402. In various embodiments, the brace end 420 may be pivotally coupled to the center point 412 of the drag brace assembly 402. In that regard, the brace end 420, the upper brace 404, and the lower brace 406 may each be pivotally coupled together at a single location 442. In various embodiments, the brace end 420, the upper brace 404, and the lower brace 406 may each be pivotally coupled together at the center point 412 using a single pin 444 at the single location 442. The single pin 444 may be define a pivot axis along a centerline of the single pin 444. The pivot axis may be an axis about which the elements may pivot.

The jury linkage 414 may have a second end 422 that is rotatably coupled to the tension strut assembly 450. The second end 422 may be a second brace end when jury linkage 414 includes a brace portion only, or the second end 422 may be a strut end when jury linkage 414 is a reforming jury linkage (e.g., jury linkage 114).

The inner cylinder 430 of the shock strut 426 may be at least partially located within the outer cylinder 428 of the shock strut 426. A wheel assembly 432 may be coupled to the tension strut 452 of the tension strut assembly 450. The inner cylinder 430 may be pivotably coupled to the tension strut 452 of the tension strut assembly 450. In response to the wheel assembly 432 contacting a ground surface, the inner cylinder 430 may be further received by the outer cylinder 428 and displacing a fluid, thus providing shock absorption for the tripod landing gear assembly 400.

The outer cylinder 428 of the shock strut 426 may have a strut attachment 446. The strut attachment 446 may be designed to be coupled to a portion of a corresponding aircraft. In various embodiments, the strut attachment 446 may be pivotally coupled to the aircraft.

The rotatable connections or couplings between components may be facilitated using spindle joints. In particular, an upper drag spindle joint 434 may be located on, and/or coupled to, the upper end 408 of the drag brace assembly 402. The upper drag spindle joint 434 may likewise be coupled to a portion of the aircraft. In that regard, the drag brace assembly 402 may rotate freely relative to the portion of the aircraft to which the upper drag spindle joint 434 is attached.

The upper tension strut spindle joint 454 may be located on, and/or coupled to, a middle portion 453 of tension strut 452. The upper tension strut spindle joint 454 may likewise be coupled to the second end 422 of the jury linkage 414. In that regard, the jury linkage 414 may rotate freely relative to the tension strut 452 to which the upper tension strut spindle joint 454 is attached.

The lower tension strut spindle joint 456 may be located on, and/or coupled to, a lower end 455 of the tension strut 452. The lower tension strut spindle joint 456 may likewise be coupled to the lower end 410 of the drag brace assembly 402. In that regard, the drag brace assembly 402 may rotate freely relative to the lower end 455 of the tension strut 452 to which the lower tension strut spindle joint 456 is attached.

As referenced above, FIG. 4 illustrates the tripod landing gear 400 in a down and locked position. The jury linkage 414 may be positioned in a line (i.e., the brace portion and the strut portion may be aligned along a same axis when the jury linkage is a reforming jury linkage (e.g., jury linkage 114) in response to the tripod landing gear assembly 400 being in the down and locked position. The jury linkage 414 may be folded (i.e., may form two lines at an angle) during the transition from the stowed position to the down and locked position and vice versa when the jury linkage 414 is a reforming jury linkage (e.g., jury linkage 414). In various embodiments, when jury linkage 414 is a brace only, the jury linkage may maintain a straight line between drag brace assembly 402 and tension strut assembly 450 during the transition from the stowed position to the down and locked position, and vice versa.

The drag brace assembly 402 may be positioned in a straight line (i.e., the upper brace 404 and the lower brace 406 may be aligned along a same plane, as defined by the three rotation axes defined by the spindle joints 434, 454, 456) in response to the tripod landing gear assembly 400 being in the down and locked position. The drag brace assembly 402 may be angled in response to the landing gear 400 being in the stowed position. In that regard and in response to the drag brace assembly 402 being angled, an angle may exist between the upper brace 404 and the lower brace 406 about center point 412. In various embodiments, the angle may be less than 180 degrees (i.e., between 0 degrees and 180 degrees), less than 90 degrees (i.e., between 0 and 90 degrees), less than 45 degrees (i.e., between 0 and 45 degrees), or the like.

A plane of the tripod landing gear assembly 400 shifts as the tripod landing gear assembly 400 is changed between the down and locked position and the stowed position. In particular, the components of the tripod landing gear assembly 400 are aligned in a plane defined by a tension strut centerline 459, defined by a centerline of the tension strut 452, and a lower drag brace centerline 409 of lower drag brace 406. In this regard, lower drag brace centerline 409 and the tension strut centerline 459 intersect. During the transition from the stowed position to the down and locked position, and vice versa, the tripod landing gear assembly 400 rotates along the plane defined by the tension strut centerline 459 and the lower drag brace centerline 409. In various embodiments, a jury linkage centerline 419, defined by a centerline of the jury linkage 414, is in the plane defined by the tension strut centerline 459 and the lower drag brace centerline 409.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for use with a tripod landing gear assembly of an aircraft, the system comprising:
   a tension strut assembly having a tension strut extending from an upper end to a lower end;
   a drag brace assembly having an upper brace and a lower brace, the upper brace pivotably coupled to the lower brace at a center point, the lower brace rotatably coupled to the lower end of the tension strut;
   a jury linkage pivotably coupled to the drag brace assembly at the center point and rotatably coupled to a middle portion of the tension strut, the middle portion between the upper end and the lower end; and
   a plane defined by a tension strut centerline of the tension strut and a lower drag brace centerline of the lower brace, wherein:
     a jury linkage centerline is disposed within the plane,
     the plane is configured to shift from a first plane in a down and locked position to a second plane in a stowed position, and
     the second plane is different from the first plane.

2. The system of claim 1, wherein the lower brace defines a lower brace centerline, wherein the tension strut centerline and the lower brace centerline define a rotation plane, wherein the tripod landing gear assembly is configured to rotate in the rotation plane.

3. The system of claim 1, further comprising a wheel assembly coupled to the lower end of the tension strut.

4. The system of claim 1, wherein the jury linkage is configured to be in an extended position in which a length of the jury linkage extends in a straight line in response to the tripod landing gear assembly being in the down and locked position and in response to the tripod landing gear assembly being in the stowed position.

5. The system of claim 1, wherein the system is configured to facilitate locking of the tripod landing gear assembly in the down and locked position and in the stowed position.

6. The system of claim 1, further comprising:
   an upper drag spindle joint configured to rotatably couple a drag brace upper end of the drag brace assembly to the aircraft;
   an upper tension strut spindle joint configured to rotatably couple the jury linkage to the middle portion of the tension strut; and
   a lower tension strut spindle joint configured to rotatably couple a drag brace lower end of the drag brace assembly to a lower portion of the tension strut, the lower portion between the lower end and the middle portion proximate the lower end.

7. The system of claim 6, further comprising a shock strut assembly having an outer cylinder configured to be coupled to the aircraft, and an inner cylinder configured to be coupled to the tension strut between the upper tension strut spindle joint and the lower tension strut spindle joint.

8. The system of claim 1, wherein the upper brace of the drag brace assembly, the lower brace of the drag brace assembly, and the jury linkage are pivotally coupled together at a single location.

9. The system of claim 8, wherein the upper brace of the drag brace assembly, the lower brace of the drag brace assembly, and the jury linkage are pivotally coupled together at the single location along a pivot axis.

10. A system for use with landing gear of an aircraft, the system comprising:
    a drag brace assembly having an upper brace and a lower brace, the upper and lower brace are pivotably coupled at a center point;
    a tension strut having an upper end and a lower end, the lower brace rotatably coupled to the tension strut proximate the lower end of the tension strut;
    a jury linkage pivotably coupled to the upper brace and the lower brace at the center point and rotatably coupled to the tension strut; and
    a plane defined by a tension strut centerline of the tension strut and a lower drag brace centerline of the lower brace, wherein:
      a jury linkage centerline is disposed within the plane,
      the plane is configured to shift from a first plane in a down and locked position to a second plane in a stowed position, and
      the second plane is different from the first plane.

11. The system of claim 10, wherein the jury linkage is configured to be in an extended position in which a length of the jury linkage extends in a straight line in response to a tripod landing gear assembly of the system being in the down and locked position and in response to the tripod landing gear assembly being in the stowed position.

12. The system of claim 10, further comprising a wheel assembly coupled to the lower end of the tension strut.

13. The system of claim 10, further comprising:
    an upper drag spindle joint configured to rotatably couple a drag brace upper end of the drag brace assembly to the aircraft;
    an upper tension strut spindle joint configured to rotatably couple the jury linkage to a middle portion of the tension strut; and
    a lower tension strut spindle joint configured to rotatably couple the lower brace of the drag brace assembly to a lower portion of the tension strut, the lower portion between the lower end and the middle portion proximate the lower end.

14. The system of claim 13, further comprising a shock strut assembly having an outer cylinder configured to be coupled to the aircraft, and an inner cylinder configured to be coupled to the tension strut between the upper tension strut spindle joint and the lower tension strut spindle joint.

15. The system of claim 10, wherein the lower brace defines a lower brace centerline, wherein the tension strut centerline and the lower brace centerline define a rotation plane, wherein the system is configured to rotate in the rotation plane.

16. The system of claim 15, wherein the upper brace of the drag brace assembly, the lower brace of the drag brace assembly, and the jury linkage are pivotally coupled together at a single location.

17. The system of claim 16, wherein the upper brace of the drag brace assembly, the lower brace of the drag brace assembly, and the jury linkage are pivotally coupled together at the single location along a pivot axis.

18. A tripod landing gear assembly for use with an aircraft, the tripod landing gear assembly comprising:
- a shock strut having an outer cylinder configured to be coupled to the aircraft, and an inner cylinder;
- a drag brace assembly having an upper brace configured to be rotatably coupled to the aircraft and a lower brace, wherein the upper and lower brace are pivotably coupled at a center point;
- a tension strut extending from an upper end to a lower end, the lower brace rotatably coupled to the tension strut proximate the lower end of the tension strut, the lower brace pivotably coupled to a lower portion of the tension strut;
- a jury linkage pivotally coupled to the drag brace assembly at the center point and rotatably coupled to the tension strut; and
- a plane defined by a tension strut centerline of the tension strut and a lower drag brace centerline of the lower brace, wherein:
  - a jury linkage centerline is disposed within the plane,
  - the plane is configured to shift from a first plane in a down and locked position to a second plane in a stowed position, and
  - the second plane is different from the first plane.

19. The tripod landing gear assembly of claim 18, further comprising:
- an upper drag spindle joint configured to rotatably couple a drag brace upper end of the drag brace assembly to the aircraft;
- an upper tension strut spindle joint configured to rotatably couple the jury linkage to a middle portion of the tension strut; and
- a lower tension strut spindle joint configured to rotatably couple the lower brace of the drag brace assembly to a lower portion of the tension strut, the lower portion between the lower end and the middle portion proximate the lower end.

20. The tripod landing gear assembly of claim 18, further comprising a wheel assembly coupled to the lower end of the tension strut.

* * * * *